United States Patent [19]

Maska

[11] 4,440,897

[45] Apr. 3, 1984

[54] PROCESS OF MAKING SUBSTANTIALLY EXTERNAL SURFACTANT-FREE VINYL POLYMER EMULSION PRODUCTS

[75] Inventor: Rudolf Maska, Pittsburgh, Pa.

[73] Assignee: PPG Industries, Inc., Pittsburgh, Pa.

[21] Appl. No.: 383,415

[22] Filed: Jun. 1, 1982

[51] Int. Cl.$^3$ .................... C08L 33/08; C08L 35/02
[52] U.S. Cl. .................... 524/460; 524/534; 524/535; 524/536
[58] Field of Search ................ 524/460, 534, 535, 536

[56] References Cited

U.S. PATENT DOCUMENTS 4,064,087 12/1977 Das ..................................... 524/460
4,151,143  4/1979 Blank et al. ......................... 524/533

FOREIGN PATENT DOCUMENTS 2079760 1/1982 United Kingdom ................ 524/460

Primary Examiner—Stanford M. Levin
Attorney, Agent, or Firm—H. Lawrence Jones; Charles R. Wilson

[57] ABSTRACT

A substantially external surfactant-free vinyl polymer emulsion product is disclosed. The process includes a first stage of dispersing in water an amine or inorganic base neutralized saturated polymer. The saturated polymer is formed from a monomeric mixture of carboxylic acid or anhydride containing ethylenic unsaturation with optionally additional copolymerizable ethylenically unsaturated monomers. In a second stage, a monomeric mixture of vinyl monomers is added to the water dispersion and the resultant mixture polymerized so as to form the substantially external surfactant-free vinyl polymer emulsion product.

10 Claims, No Drawings

PROCESS OF MAKING SUBSTANTIALLY EXTERNAL SURFACTANT-FREE VINYL POLYMER EMULSION PRODUCTS

BACKGROUND OF THE INVENTION

The subject invention relates to processes of making vinyl polymer emulsion products. More particularly, it relates to substantially external surfactant-free processes of making vinyl polymer emulsion products.

Vinyl polymer emulsion products are well known and have been used extensively. They have found particular use in the coatings arts. Polymeric emulsions have become more prevalent in recent years due to the water base nature of the emulsions. Such emulsions necessarily have a low organic solvent content and thus avoid many of the environmental and cost problems associated with organic solvents. Typical prior art processes for making vinyl polymer emulsions have involved the use of an external surfactant to aid in dispersing the vinyl polymer in water. However the external surfactants used in the process are carried throughout the process and into coating compositions formulated with the emulsions. Films formed from such coating compositions still contain the external surfactant. This has proved disadvantageous due to the fact most surfactants are water sensitive and therefore the resultant film is also water sensitive. Additionally the surfactant is free to leach out. This proves to be a disadvantage whenever the coating composition is used for the internal coating of containers. Thus the leaching out of the surfactant into the container's contents is particularly troublesome.

There is accordingly a need for a process for making vinyl polymer emulsion products without the use of an external surfactant. Such objective is met by the herein disclosed and claimed process.

As used herein all percentages and ratios are by weight unless otherwise indicated.

SUMMARY OF THE INVENTION

The process of preparing a substantially external surfactant-free polymer emulsion product occurs in two stages. In the first stage, an amine or inorganic base neutralized saturated polymer is dispersed in water. The saturated polymer is derived from a first monomer mixture of from about 2 percent to about 100 percent carboxylic acid or anhydride having ethylenic unsaturation and the balance, if any, of at least one other copolymerizable ethylenically unsaturated monomer. In the second stage, a second monomer mixture of vinyl monomers and a polymerization catalyst is added to the first stage dispersion. The resultant mixture is thereafter polymerized to form the substantially external surfactant-free polymer emulsion product.

The vinyl polymer emulsion resulting from the process of this invention is especially useful in coating compositions.

DETAILED DESCRIPTION OF THE INVENTION

The process of this invention relates to forming a substantially external surfactant-free vinyl polymer emulsion product. As used herein, the term external surfactant is used in its conventional sense; that is, a surfactant which does not polymerize with the vinyl monomers used in step (b) of the process. The emulsion product is preferably external surfactant free. Minor amounts of external surfactants, i.e., less than about 1, preferably less than about 0.5, percent based on the vinyl polymer can be tolerated, though no advantage is gained by their use. The process comprises essentially two stages. In the first stage, an amine or inorganic base neutralized saturated polymer is dispersed in water. In the second stage, the dispersed polymer is blended with vinyl monomers and thereafter the mixture polymerized to form the vinyl emulsion product. Details of steps of the process are found in the following paragraphs.

The first stage of the process in this invention involves dispersing an amine or inorganic base neutralized saturated polymer in water. Suitable polymers are commercially available and can be used. Monomers used to make the saturated polymer and neutralizing amines or inorganic bases are illustrated immediately hereafter below with respect to the alternative method of obtaining the first stage saturated polymer. Alternatively, the polymer dispersed in water in the first stage of the process can be made from a first monomer mixture, consisting essentially of from about 2 percent to about 100 percent of a carboxylic acid or anhydride having ethylenic unsaturation. The balance, if any, of the monomer mixture is at least one other copolymerizable ethylenically unsaturated monomer. Preferably the monomeric mixture consists essentially of from about 5 percent to about 75 percent, more preferably from about 5 percent to about 25 percent of the carboxylic acid or anhydride with the balance being the copolymerizable ethylenically unsaturated monomer. Examples of the carboxylic acid or anhydride containing ethylenic unsaturation include acrylic acid, methacrylic acid, maleic acid, maleic anhydride, and the alkyl half esters of maleic acid containing from 1 to 8 carbon atoms in the alkyl group. Preferred herein is the acrylic acid. The other copolymerizable ethylenically unsaturated monomers include the $C_{1-8}$ alkyl esters of acrylic acid and methacrylic acid such as methyl, ethyl, propyl, butyl, or 2-ethylhexyl acrylates and methacrylates; hydroxyalkyl acrylates and methacrylates having 2 to 4 carbon atoms in the alkyl group, including 2-hydroxyethyl acrylate or methacrylate, 2-hydroxypropyl acrylate or methacrylate; styrenes; acrylamides; and methacrylamides. N-alkoxymethylacrylamides, such as N-ethoxymethylacrylamide and N-butoxymethylacrylamide, are preferred copolymerizable monomers because of the internal curing sites they provide in the polymer emulsion product.

The aforementioned monomeric mixture is blended together with a suitable organic solvent, a free radical polymerization catalyst and optionally a molecular weight regulator and thereafter polymerized to form a polymer having an average molecular weight of from about 3,000 to about 70,000. Usually the solvent is first heated to reflux and the mixture of monomers and free radical polymerization catalyst is added simultaneously and slowly to the refluxing solvent. Additional catalyst is optionally added and the reaction mixture held at polymerizing temperatures so as to reduce the free monomer content of the reaction mixture. Water soluble or water-miscible solvents are used in the polymerization. Examples of suitable solvents include alcohols such as ethyl alcohol, tertiary-butyl alcohol and tertiary-amyl alcohol; ketones such as acetone, methylethylketone; and glycol ethers such as ethylene glycol monomethyl ether, ethylene glycol monoethyl ether and diethylene glycol ethyl ether. The free radical polymerization catalyst which is used includes azobis (alpha-gamma)-dimethylvaleronitrile, tertiary-butylperbenzoate, tertiary-butylperacetate and benzoyl peroxide. The polymerization is continued until the free monomeric content is reduced to below about 0.5 percent, preferably below about 0.1 percent.

The polymerized material is next made dispersible in water by treating it with an amine or inorganic base. Satisfactory amines include ammonia, and primary, secondary and tertiary amines. The preferred neutralizing material is a tertiary amine. Examples of suitable amines include ethanol amine, diethanol amine, N-methylethanol amine, dimethylethanol amine, methyl amine, ethyl amine, diethyl amine, trimethyl amine, triethyl amine and morpholine. Suitable inorganic bases include potassium hydroxide and sodium hydroxide. The amount of amine, or inorganic base employed is sufficient to disperse the formed polymer in water. Generally the amount needed is equivalent to at least 25 percent of the total theoretical neutralization. The dispersion can be completely neutralized. Usually the pH of the final aqueous dispersion is adjusted to about 7.5 to about 11.

The second stage of the process involves the formation of a second monomer mixture containing vinyl monomers and a polymerization catalyst. The vinyl monomers which are used in the second monomer mixture are vinyl chloride, vinylidene chloride, ethylene, propylene, butylene, butadiene, and mixtures thereof. Preferred are vinyl chloride and vinylidene chloride. A minor amount of the second monomer mixture can also comprise monomers which are capable of addition polymerization with the vinyl monomers. Such monomers include those previously listed as being useful in the first stage. Polymerization catalysts used in the second stage can be the same as those used in the first stage.

The amount of the second monomer mixture added to the dispersion of the first stage is such that the proportion of the second monomer mixture consists essentially of from about 5 percent to about 95 percent of the total weight of monomers used in forming the polymer emulsion product. Preferably, the proportion of the second monomer mixture ranges from about 25 percent to about 75 percent and more preferably from about 40 percent to about 60 percent of the total weight of the monomers used. Generally, the lower the amount of carboxylic acid or anhydride used in forming the water-dispersed polymer of step (d), the greater the proportion of that polymer which must be used in the second stage.

The second monomer mixture is preferably added slowly to the dispersion. It is possible that more than one stream of monomers may be added to the dispersion. This is particularly applicable when vinyl chloride is the vinyl monomer used (since it is a gaseous material) and any additional monomer is in a liquid state. Generally, however, the components of the second monomer mixture are first blended together and thereafter slowly added to the dispersion. The resultant mixture is polymerized so as to form the polymer emulsion product of the invention. Temperatures for the second polymerization step can range from about 60° C. to about 100° C.

The resultant substantially external surfactant-free vinyl polymer emulsion is useful for coating compositions. Their use in coating compositions intended for the lining of can interiors is especially beneficial. The coatings compositions can have the vinyl polymer emulsion as the main film-former when sites of internal cross-linking are provided, such as when N-alkoxymethylacrylamides are used in the process. External cross-linking agents such as the conventional aminoplasts, phenoplasts and blocked isocyanates are often used in the compositions.

The examples which follow further illustrate the subject invention.

EXAMPLE I

A reaction vessel is provided with stirring means and means for providing a nitrogen blanket. An acrylic acid monomeric mixture is initially made, consisting of 161 parts of acrylic acid, 237.4 parts of N-butoxymethylacrylamide, 402.5 parts of styrene and 402.5 parts of ethyl acrylate, 111.5 parts of butanol, and 37.1 parts of xylene. The vessel has initially charged to it 159 parts of ethylene glycol monoethyl ether, 450 parts of isopropyl alcohol and 290 parts of the acrylic acid monomeric mixture. The resultant mixture is heated until reflux conditions are obtained. Thereafter the balance of the acrylic acid monomeric mixture is added together with 18 parts of azo bisisobutyronitrile. The mixture is slowly added over a 3 hour time period. At this point 6 parts of t-butylperbenzoate is added and the resultant mixture held at 94° C. for 2 hours. Thereafter another 6 parts of t-butylperbenzoate is added and the resultant mixture held for another 2 hours. The Gardner-Holdt viscosity of the mixture at this point is C+. The mixture is further heated while distilling off 450 parts of solvent. Next 59.7 parts of dimethylethanol amine and 1882 parts of water are added. The resultant mixture has a total solids content of 33.75 percent, an acid value of 32.7 and a pH of 7.5.

A portion of the above-described aqueous dispersion (296 parts) is next blended with 100 parts of water and 3.7 parts of dimethylethanol amine and placed in a stainless steel pressure reactor. After 2.5 parts of azo bisisobutyronitrile catalyst is added the mixture is frozen by a dry ice acetone solution. The vessel is sealed and 100 parts of vinyl chloride is charged through a valve. The reactor is next placed in a 80° C. hot water bath and the reactor gently rocked. After about 21½ hours the lid of the pressure reactor vessel is removed and the contents analyzed. The resultant polymer emulsion product has a solids content of 38.8 percent, an acid value of 20.6, a pH of 7.2, and a viscosity of 75 centipoise.

EXAMPLE II

Another polymer emulsion product is made in this example wherein vinylidene chloride is used.

A stainless steel pressure reactor is initially charged with 296 parts of the water dispersion described in Example I, 100 parts water, 3.7 parts dimethylethanol amine, and 2.5 parts of azo bisisobutyronitrile catalyst. 100 parts of vinylidene chloride is next added to the pressure reactor and the lid placed thereon. The pressure reactor is next placed in an 80° C. hot water bath and gently rocked for about 16½ hours. The vessel is cooled by cold water and the valve opened. The pH of the mixture is adjusted to 6.8 by adding a dimethylethanol amine water mixture.

The resultant polymer emulsion product has a solids content of 40.4 percent, an acid value of 23, a viscosity of 850 centipoise and a pH of 6.2.

The polymer emulsion products illustrated in the above examples are especially useful when formulated into coating compositions.

What is claimed is:

1. A process of preparing a substantially external surfactant—free polymer emulsion product which comprises the steps of:
   (a) dispersing in water an amine or inorganic base neutralized saturated polymer, said polymer being derived from a first monomer mixture consisting essentially of from about 2 to about 100 percent by weight of a carboxylic acid or anhydride having ethylenic unsaturation and the balance, if any, of at least one other copolymerizable ethylenically unsaturated monomer wherein said monomer is alkyl acrylate or alkyl methacrylate containing from 1 to 8 carbon atoms, hydroxyalkyl acrylate or methacrylate containing from 2 to 4 carbon atoms in the alkyl moiety, styrenes, acrylamides, methacrylamides or a mixture thereof;
   (b) adding a second monomer mixture of vinyl monomer and a polymerization catalyst to the dispersion of step (a), said vinyl monomer being vinyl chloride, vinylidene chloride, or a mixture thereof, and a proportion of the second monomer mixture added being such as to consist essentially of from about 25 percent to about 75 percent by weight of the total weight of the monomers used in forming the polymer emulsion product; and
   (c) polymerizing the mixture of step (b) to form the polymer emulsion product.

2. The process of claim 1 wherein the first monomer mixture of step (a) consists essentially of from about 5 percent to about 75 percent by weight of the carboxylic acid or anhydride.

3. The process of claim 2 wherein the carboxylic acid or anhydride is acrylic acid, methacrylic acid or a mixture thereof.

4. The process of claim 3 wherein the copolymerizable ethylenically unsaturated monomer used in step (a) is a $C_{1-8}$ alkyl acrylate or methacrylate, styrene, N-alkoxymethylacrylamide or a mixture thereof.

5. The process of claim 4 wherein the vinyl monomer used in step (b) is vinyl chloride.

6. The process of claim 5 wherein the second monomer mixture is mixed with the dispersion of step (a) so as to represent from about 25 percent to about 75 percent of the total weight of the monomers used in forming the polymer emulsion product.

7. The process of claims 1 or 5 wherein the first monomer mixture of step (a) consists essentially of from about 5 percent to about 25 percent by weight of the carboxylic acid or anhydride.

8. The process of claim 7 wherein the second monomer mixture is mixed with the dispersion of step (a) so as to represent from about 40 percent to about 60 percent of the total weight of the monomers used in forming the polymer emulsion product.

9. The process of claim 8 wherein the polymer of step (a) is neutralized with a tertiary amine.

10. A polymer emulsion product made by the process of claim 1.

* * * * *